Figure 1:
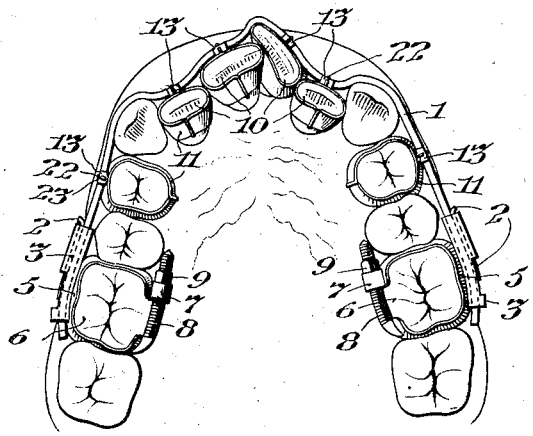

Aug. 18, 1925.

E. H. ANGLE 1,549,739

ORTHODONTIC APPLIANCE

Filed March 3, 1925

Inventor
Edward H. Angle,
By Clifton C. Hallowell
Attorney

Patented Aug. 18, 1925.

1,549,739

UNITED STATES PATENT OFFICE.

EDWARD H. ANGLE, OF PASADENA, CALIFORNIA.

ORTHODONTIC APPLIANCE.

Application filed March 3, 1925. Serial No. 12,828.

*To all whom it may concern:*

Be it known that I, EDWARD H. ANGLE, a citizen of the United States, and a resident of Pasadena, in the county of Los Angeles, State of California, have invented certain new and useful Improvements in Orthodontic Appliances, of which the following is a specification, reference being had to the accompanying drawings.

My invention is applicable to the art of correcting the position of malposed teeth of the dental arch, and particularly relates to that class of devices in which an arch-bar is adjustably supported at its opposite terminals by anchorages clamped to suitably disposed posterior teeth or molars, and is especially directed to the means by which said arch-bar is connected, intermediate of its ends, with selected teeth of the dental arch.

The principal objects of my invention are to provide a tooth engaging band with an arch-bar attaching bracket of such proportions and of such reduced bulk, or size, as to afford a minimum interference with the lips and cheeks, whereby a consequent lessening of discomfort and inconvenience to the wearer is effected.

Other objects of my invention are to provide the tooth-band with a bracket that is so constructed and arranged as to afford such a reinforcement for said band as to require no supplemental stiffening or thickening of the tooth-band as has been commonly employed.

My invention comprehends an arch-bar attaching bracket, the construction of which is ideally adapted to be conveniently soldered to the tooth-band, and to afford such a tenacious attachment therewith, that any possible movement of the tooth, to which the band may be fitted, may be effected without danger of distortion or fracture of the appliance.

Further objects of my invention are to provide a tooth-band with a bracket having means cooperative to so firmly lock an arch-bar therein as to insure the firm, accurate and positive movements of either the crown or root of a tooth in any desired direction, and thereby so facilitate the co-operative action of the arch-bar that it may as readily effect the movement of teeth lingually, labially and buccally, or they may be rotated or tipped transversely with respect to their axes, and may be as readily forced laterally in the direction of the length of the arch-bar with equal accuracy of movement.

Specifically stated, the form of my invention as hereinafter described, comprises a tooth-band provided with a bracket, of substantially rectangular oblong configuration, extended transversely across said tooth-band, and having a slot opening outwardly therefrom, into which an arch-bar may be snugly fitted by movement laterally with respect to said tooth-band, and also having oblique relatively diverging apertures affording guides through which the ends of a wire ligature may be passed and drawn taut to form a loop transversely embracing said arch-bar, and affording a retaining lock for said arch-bar, when the projecting end portions of said ligature are bent over against the ends of said bracket and clipped off to afford loop retaining prongs.

My invention also includes all of the various novel features of construction and arrangement as hereinafter more definitely specified.

Figure 2:
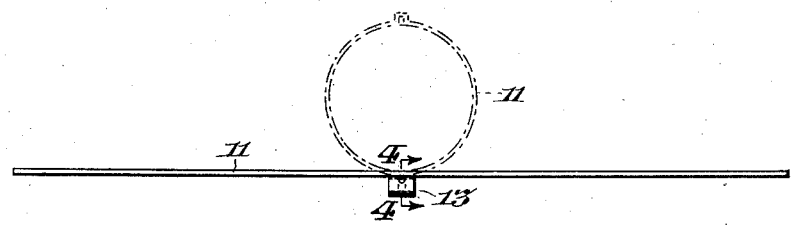
Figure 3:
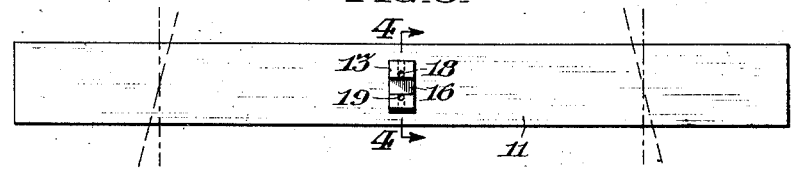
Figure 6:
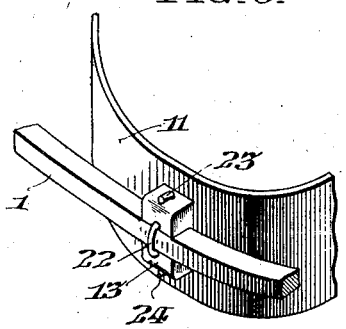
Figure 4:
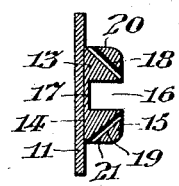
Figure 5:
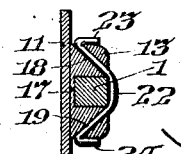
Figure 7:
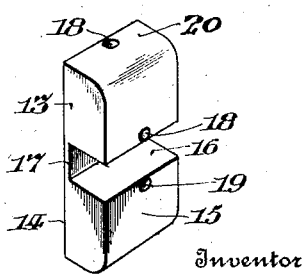

In the accompanying drawings, Figure 1 is an inverted plan view of the upper human dental arch, showing a convenient embodiment of my invention attached to selected teeth of said dental arch; Fig. 2 is an enlarged plan view of the one of the tooth attachments comprising a tooth-band extended in a plane and an arch-bar attaching bracket, constructed according to my invention, attached thereto; Fig. 3 is a front elevational view of the tooth attachment shown in Fig. 2; Fig. 4 is a transverse sectional view of said tooth attachment, taken on the line 4—4 in Figs. 2 and 3; Fig. 5 is a transverse sectional view similar to Fig. 4, but showing the arch-bar and its lock in place; Fig. 6 is an enlarged fragmentary perspective view of the formed tooth-band with its arch-bar attaching bracket secured thereto and the arch-bar engaged in the slot of said bracket and held in place by the ligature forming the lock looped over the arch-bar; and Fig. 7 is a greatly enlarged perspective view of the bracket per se which is shown in the preceding figures attached to the tooth-band.

The tooth regulating appliance to which this invention is especially applicable is indicated in a general way in Fig. 1, and includes, together with associated parts, an arch-bar 1 bent to substantially conform to the dental arch and having its extremities provided with tangs 2 and extended through anchor sheaths 3, with which said tangs may be engaged to retain the arch-bar 1 in adjusted position, and which are carried by the anchor-bands 5, of well known construction.

As shown in Fig. 1, the anchor bands 5 are attached to the first molar teeth 6, which serve as anchor abutments upon opposite sides of the dental arch, said bands being provided with an eye 7 at one end, and at the other end, a threaded stem 8 extended through said eye and arranged to be adjusted therein by the nut 9 to clamp the band 5 upon said abutment teeth 6, as is obvious.

The gist of my invention resides in the means of securing the arch-bar 1 to the malposed teeth 10 in the dental arch, and comprises the tooth-band 11 and its arch-bar attaching bracket 13, shown in Figs. 2 and 3 in its initial form extended in a plane, and arranged to be cut to the length desired as indicated by the transverse dot-and-dash lines or the oblique dash lines thereon shown, and formed into the tooth embracing ring as shown by the circular dot-and-dash lines as indicated in Fig. 2.

As best shown in Figs. 4 and 5, the bracket 13 may be formed of a substantially rectangular piece of metal having its rear wall 14 affording an uninterrupted plane surface coextensive with the extreme dimensions of said bracket, which not only affords a tenacious solder joint with the tooth-band 11, but also provides such a reinforcement for said tooth-band as to eliminate the necessity of any auxiliary reinforcement as heretofore employed.

The front or outer wall 15 of the bracket 13 is provided with the deeply cut or depressed slot 16 extending transversely through the body of said bracket and in parallel relation to the length of said tooth-band, and so nearly bisecting the bracket body as to afford but a relatively thin web 17, sufficient only to insure the required rigidity, yet permitting the arch-bar to so closely approach the tooth-band as to conserve space and thereby minimize the extent of projection of the regulating appliances in the mouth of the patient.

The bracket 13 is also provided with the relatively divergent apertures 18 and 19 forming passageways which may preferably be cylindrical and extended therethrough in a plane transverse to said slot, and having their respective forward openings disposed in the outer wall 15, closely adjacent to the opposite edges of the slot 16, and their inner openings respectively disposed in the upper wall 20 and the lower wall 21 of said bracket, or the opposite walls forming the ends of said bracket that are parallel with the length of said slot 16.

As shown in section in Fig. 5 and in perspective in Fig. 6, the apertures or passageways 18 and 19 provide suitable guides through which the opposite ends of a piece of wire ligature arranged to form a retaining lock, may be threaded or passed to provide a retaining loop 22 which is arranged to embrace the arch-bar 1, and when drawn taut and the projecting free extremities of said ligature, forming the prongs 23 and 24, are bent over to engage the upper and lower walls 20 and 21 respectively, as best shown in Fig. 5, serves as a lock to rigidly retain said arch-bar in the slot 16, in such rigid relation with the bracket 13 as to prevent their relative movement.

As shown in the several figures, the slot 16 in the bracket 13 opens outwardly from the tooth-band and consequently affords convenient access thereto for the easy manipulation of the arch-bar with respect thereto, irrespective of the shape and position of said arch-bar which is shown engaged in the slot in Fig. 6.

Thus it will be obvious that while the ligature lock, as best shown in Fig. 5, firmly holds the arch-bar 1 in the slot 16 and engages it rigidly with the bracket 13, it may be readily loosened to release said arch-bar for longitudinal adjustment, by turning the free projecting prongs 23 and 24 in parallel relation with the plane of the tooth-band, or in relative alinement, and with a pair of pliers engaging the loop 22, draw said loop outwardly sufficient to permit the desired adjustment of said arch-bar.

My invention is advantageous in that the bracket serves as a reinforcement affording a maximum solder attaching surface, and provides a uniform three-surface engagement with the arch-bar, which snugly fits therein, and which may be readily shaped and adjusted to engage therewith from the outer side thereof.

Furthermore, the bracket attachment affords such a positive locking means comprising the ligature wire lock, that said arch-bar may be so rigidly engaged with the bracket as to insure an ideal torque power in any desired direction, whereby the movement of the tooth roots either labially or lingually, and the tipping mesially or distally of the crowns and roots, as well as the rotation of the tooth, may be effected with equal facility. In fact, every possible desired movement of the teeth may be readily accomplished thereby.

I do not desire to limit my invention to the precise details of construction and arrangement as herein specified, as it is obvious that various modifications may be made therein without departing from the essential features of my invention as defined in the appended claims.

Having thus described my invention, I claim:

1. An orthodontic appliance comprising a tooth-band bracket having an arch-bar receiving slot, and having relatively divergent apertures extended from said slot through the body of said bracket, said apertures affording guides through which an arch-bar retaining ligature may be threaded.

2. An orthodontic appliance comprising a tooth-band bracket having an arch-bar receiving slot, and having relatively divergent apertures extended from said slot through the body of said bracket in a plane transverse to said slot, said apertures affording guides through which an arch-bar retaining ligature may be threaded.

3. An orthodontic appliance comprising a tooth-band bracket having an arch-bar receiving slot in its outer face, and having relatively divergent apertures extended from said slot through the body of said bracket, said apertures affording guides through which an arch-bar retaining ligature may be threaded.

4. An orthodontic appliance comprising a tooth-band bracket having an arch-bar receiving slot, and having apertures extended through the body of said bracket from the opposite sides of said slot in divergent relation, said apertures affording guides through which an arch-bar retaining ligature may be threaded.

5. An orthodontic appliance comprising a tooth-band bracket having an arch-bar receiving slot in its outer face, and having apertures extending from the opposite sides of said slot through said body in divergent relation, said apertures affording guides through which an arch-bar retaining ligature may be threaded.

6. An orthodontic appliance comprising a tooth-band bracket having an arch-bar receiving slot in its outer face, and having relatively divergent apertures extending through the body of said bracket and terminating in relatively opposite sides, and approximating the rear face of said bracket, said apertures affording guides through which an arch-bar retaining ligature may be threaded.

7. An orthodontic appliance comprising a tooth-band bracket having an arch-bar receiving slot in its outer face, and having apertures extending through the body of said bracket and opening through said outer face and through the relatively opposite sides which are parallel with said slot, said apertures affording guides through which an arch-bar retaining ligature may be threaded.

8. An orthodontic appliance comprising a tooth-band bracket provided with an arch-bar attachment having an arch-bar receiving slot in its outer face, and having relatively divergent apertures extended through the body of said attachment from the opposite sides of said slot and opening through the upper and lower walls of said attachment, and a lock arranged to rigidly retain an arch-bar in said slot and comprising a loop embracing said arch-bar, having prongs extended through said apertures and bent into cooperative engagement with said attachment to retain said loop taut about said arch-bar.

9. An orthodontic appliance comprising a tooth-band bracket having an arch-bar receiving slot in its outer face, and having divergent guides arranged to direct the ends of a ligature in such position as to afford a loop embracing an arch-bar in said slot, with diverging prongs extended therefrom, and the free extremities thereof bent to engage the opposite sides of said attachment and form a lock arranged to retain said arch-bar in said slot.

In witness whereof, I have hereunto set my hand this 24th day of February, A. D. 1925.

EDWARD H. ANGLE.